March 19, 1963 S. DUINKER ETAL 3,082,343

DEVICE HAVING AN ELECTRO-LUMINESCENT ELEMENT

Filed Sept. 6, 1960 2 Sheets-Sheet 1

INVENTORS
Simon Duinker
Johannes G. v. Santen

BY
Frank R. Jifari
AGENT

DEVICE HAVING AN ELECTRO-LUMINESCENT ELEMENT

Filed Sept. 6, 1960 2 Sheets-Sheet 2

INVENTORS
Simon Duinker
Johannes G. van Santen
BY
Frank R. Jifari
AGENT

United States Patent Office 3,082,343
Patented Mar. 19, 1963

3,082,343
DEVICE HAVING AN ELECTRO-LUMINESCENT ELEMENT

Simon Duinker and Johannes Gerrit van Santen, Eindhoven, Netherlands, assignors to North American Philips Company, Inc., New York, N.Y., a corporation of Delaware Filed Sept. 6, 1960, Ser. No. 54,003
Claims priority, application Netherlands Sept. 7, 1959
10 Claims. (Cl. 313—108)

Figure 1:
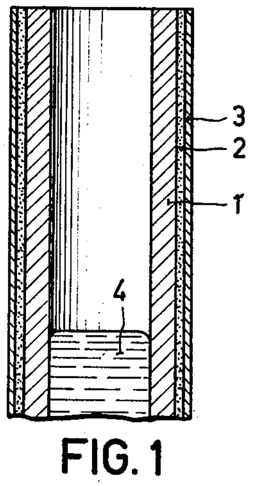

This invention relates to a device having an electro-luminescent element comprising an electro-luminescent member and two electrodes for setting up a voltage across the electro-luminescent member. By setting up an electric voltage between the electrodes, in particular an A.C.-voltage, the electro-luminescent member begins to emit radiation.

The device according to the invention is characterized in that in at least one of the electrodes the electric connection between the electrode and at least a part of the electro-luminescent member is effected, through a fluid, across a variable area. By setting up an A.C.-voltage between the electrodes and since the electric voltage is not set up directly across the electro-luminescent member by the electrodes, only that part of the electro-luminescent member can emit radiation, across which the electric connection is set up via the fluid. By variation of the contact area of the fluid and the electro-luminescent member, the luminescing part of the electro-luminescent member is varied correspondingly. The fluid should naturally have properties such as to be able to set up the electric connection and should, therefore, be galvanically or dielectrically conductive. As galvanically conductive fluid there may be used, for example, mercury or a salt solution. Mercury is to be preferred, because it does not moisten the adjacent member and because it has a good meniscus. As dielectrically conductive fluid there may be used, for example, nitrobenzene or methanol.

The devices described herein may be used in cases where a varying luminescent area or where a luminescing area of variable size is desirable, for example for advertising or for making the height of a fluid level visible.

According to a particular embodiment of the invention, the electro-luminescent member is covered at the one side with a transparent conductive layer as one electrode, and the electric connection with the second electrode is effected at the other side through a fluid. This device has the advantage that the light emitted by the electro-luminescent member need pass the transparent conductive layer only, so that for this device it is not necessary for the liquid to be transparent.

The electro-luminescent member preferably consists of a non-conductive carrier which at the one side is coated at least partially with a layer of electro-luminescent material, said carrier forming at least a part of the wall of a vessel or tube. So in this device, the electro-luminescent member also forms at least a part of the wall with the fluid on its inside or its outside, which is a simple construction. The non-conductive carrier consists, for example, of glass. Preferably, the carrier consists of a substance having a dielectric constant of at least 20, for example ceramic dielectrics formed of titanium dioxide or of metatitanates having the perowskite structure or mixed crystals thereof. In such a case, the voltage drop at the carrier is slight, so that a larger voltage is set up across the layer of electro-luminescent material which is proportional to the intensity of the light emitted. In addition, in such a case the voltage across the layer of electro-luminescent material may be larger than would be permitted if this layer only should be provided between the two electrodes, since the breakdown strength is determined by the series connected electro-luminescent layer and non-conductive carrier. For the carrier, in particular a substance will be used consisting substantially of a compound having the formula $ARO_3$, in which formula A is at least one of the metals Ba, Sr, Pb and Ca, and R at least one of the metals Ti, Zr and Sn. These materials have the additional advantage that their coefficient of expansion approximately equals that of glass, while these titanates and glass can be fused easily. In a simple manner a tubular carrier may then be manufactured consisting of glass, a layer of electro-luminescent material and a layer of said titanates, zirconates or stannates between the glass and the electro-luminescent pan layer.

Particularly to improve the transverse conductivity of the transparent conductive layer, this layer is provided with a tape-shaped metal conductor having its longitudinal axis in the direction in which the area of contact between the electrode and electro-luminescent layer varies. By the use of such a conductor no voltage drop occurs across the transparent conductive layer. If such a voltage drop occurred, the same voltage would not be set up everywhere across the electro-luminescent layer, which would result in a difference in intensity of the emitted light.

The inside or outside of the carrier may be provided with the layer of electro-luminescent material. A carrier having a layer of electro-luminescent material on its outside is to be preferred, since in that case the emitted light can be observed immediately. Such a device may, for example, be constructed as a thermometer which, when placed in a dark or nearly dark room, can be read all the same.

The electro-luminescent member may be built up of various components. On the one hand, the electro-luminescent layer may be built up of various component layers not forming an assembly together, on the other hand the layer may comprise component layers having different properties. In these cases, in particular when the luminescent part is a measure of a physical quantity, the device is constructed so that the exceeding of a given value of the physical quantity is correlated with a discontinuous change of the emitted light. The various properties of the component layers may be such that the components have mutually different emission intensities or in that the components have mutually different emission wave lengths. The device may then be constructed such that, if the physical quantity exceeds a critical value, the intensity of the emitted light strongly increases or light of a conspicuous colour is emitted.

Figure 2:
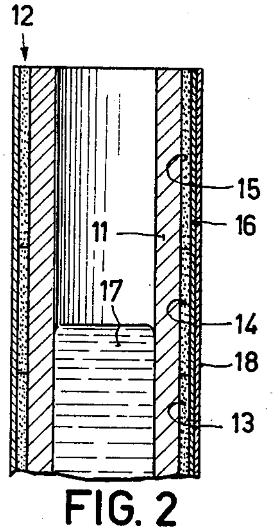
Figure 3:
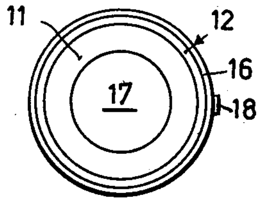

In order that the invention may be readily carried into effect, it will now be described, by way of example, with reference to the accompanying drawing representing some embodiments of devices according to the invention. The FIGURES 1, 2, 4, 6 and 7 diagrammatically show in cross sectional view five different embodiments of devices according to the invention. FIGURE 3 is a plan view of the device shown in FIGURE 2 and FIGURE 5 is a plan view of the device shown in FIGURE 4.

In FIGURE 1, a tubular carrier consisting of a barium-calcium-titanate-zirconate having a composition of 44 mol percent BaO, 4 mol percent CaO, 44 mol percent $TiO_2$ and 8 mol percent $ZrO_2$ is indicated by 1.

The outside of this carrier is provided with the electro-luminescent layer 2 consisting of ZnS(Cu, Al). The electro-luminescent layer is covered with a transparent conductive layer 3 of tin oxide serving as electrode. Part of the tube is filled with mercury 4 which is in contact with the second electrode not shown and the level of which (corresponding to a definite temperature, pressure, etc.), is determinative for the luminescing part of the layer 2.

In FIGURE 2, a tubular carrier consisting of barium-calcium-titanate-zirconate is indicated by 11. The outside of this carrier is provided with an electro-luminescent layer 12 built up of the components 13, 14 and 15 each having a different emission wave length. The component 13 consists, for example of ZnS(Cu, Al) which shows a green luminescence, the component 14 consists, for example of ZnS(Cu, Cl), which shows a blue luminescence and the component 15 consists, for example of ZnSe(Cu, Al), which shows a red luminescence. The electro-luminescent layer 12 is covered with a transparent conductive layer 16 of tin oxide serving as electrode. Part of the tube is filled with mercury 17 which is in contact with the second electrode not shown. To improve the transverse conductivity, a part of the layer 16 is covered with a tape-shaped silver conductor 18 in the longitudinal direction of the tube, that is to say in the direction in which the contact area of mercury 17 and carrier 11 may vary. FIGURE 3 is a plan view of the device shown in FIGURE 2.

Figure 4:
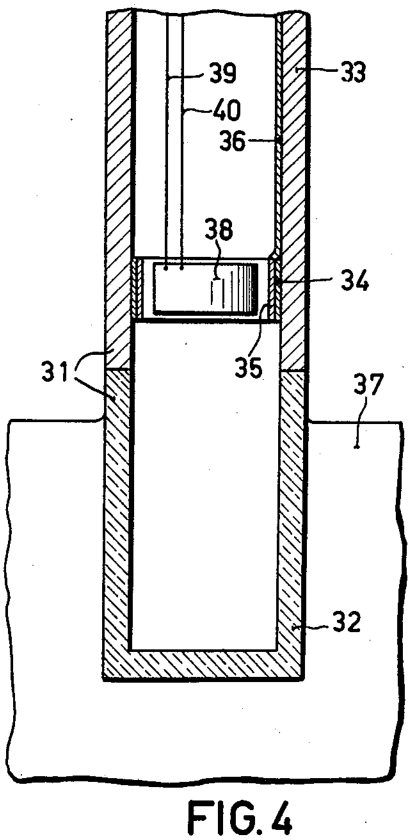
Figure 5:
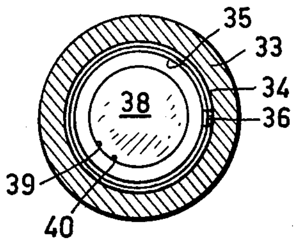

In FIGURE 4, a tube closed at its lower end is indicated by 31. The lower part 32 of this tube 31 consists of glass and the upper part 33 of barium-calcium-titanate-zirconate serving as carrier. A part of the inside of the tube is covered with an electro-luminescent layer 34 which is covered itself with a transparent conductive layer 35 of tin oxide serving as electrode. The layer 35 is connected to a voltage source via the metal layer 36 which is provided on a part of the inside of the tube and in its longitudinal direction. The tube 31 is placed in a conductive fluid 37, for example an aqueous salt solution, which is in contact with the second electrode not shown. In order to determine whether light is emitted by the electro-luminescent layer, an indication element 38 is provided in the tube 31 at the level of the electro-luminescent layer 34 which element is sensitive to the radiation emitted by the layer 34 if the level of the fluid 37 is above a given height. The supply wires 39 and 40 of the indication element 38 are passed out. The tube 31 is rigidly provided in a manner not shown, so that the movement of the fluid 37 has no influence on the height of the tube 31. FIGURE 5 is a plan view of FIGURE 4.

Figure 6:
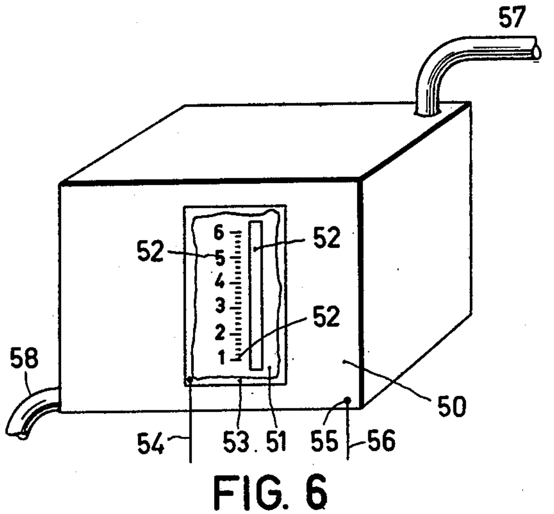

FIGURE 6 shows in a sectional view a device according to the invention. In the opaque container 50, the part 51 is formed of barium titanate. This part 51 is covered with a vertical line, horizontal scale divisions and numerals formed of an electro-luminescent material 52. The part 51 and the component layers 52 are covered with a transparent conductive layer 53 of tin oxide. The component layers 52 have the shape of a vertical line, horizontal scale division, and the numerals 1, 2, 3, 4, 5 and 6. The electric voltage is supplied to the layer 53 via the lead 54. By the liquid-tight bushing 55, the lead 56 is brought into contact with the fluid contained in the container 50 which may enter the container through the supply pipe 57 and may leave the container through the outlet pipe 58. Dependency on the height of the conductive fluid in the container, for example a salt solution, the vertical line, the horizontal scale division, and the numerals will luminesce when an electric voltage is produced.

Figure 7:
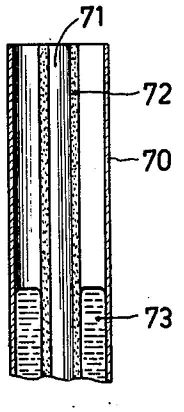

FIGURE 7 shows a cross sectional view of another embodiment of the device according to the invention. In the glass tube 70 there is a metal bar 71 serving as electrode surrounded by the electro-luminescent member 72. If the tube 70 is filled with a conductive transparent fluid 73, for example a salt solution, which is in contact with the second electrode not shown, the electro luminescent member 72 will emit light corresponding to the height of the level of the fluid 73 when an electric A.C. voltage is set up. This light emanates through the transparent fluid 73 and the glass wall of the tube 70.

What is claimed is:

1. A device having an electro-luminescent element comprising an electro-luminescent member and two electrodes for setting up a voltage across the electro-luminescent member wherein the electric connection between at least one of the electrodes and at least a part of the electro-luminescent member is effected, through a fluid, across a variable area.

2. The device of claim 1, wherein the electro-luminescent member is covered on the one side with a transparent conductive layer as one electrode and on the other side the electric connection with the second electrode is effected via a fluid.

3. The device of claim 2, wherein the electro-luminescent member consists of a non-conductive carrier which at its one side is coated at least partially with a layer of electro-luminescent material and which carrier forms at least a part of the wall of a vessel or tube.

4. The device of claim 3, wherein the carrier consists essentially of a substance having a dielectric constant of at least 20.

5. The device of claim 4, wherein the carrier consists essentially of a compound having the formula $ARO_3$, in which formula A is at least one of the metals selected from the group consisting of Ba, Sr, Pb and Ca, and R at least one of the metals selected from the group consisting of Ti, Zr and Sn.

6. The device of claim 4, wherein the transparent conductive layer is provided with a metal conductor strip having its longitudinal axis in the direction in which the area varies.

7. The device of claim 2, wherein the outside of the carrier is provided with the layer of electro-luminescent material.

8. The device of claim 1, wherein the electro-luminescent member is built up of various components.

9. The device of claim 8, wherein said components have mutually different emission intensities.

10. The device of claim 8, wherein said components have mutually different emission wave lengths.

References Cited in the file of this patent

UNITED STATES PATENTS

| | | |
|---|---|---|
| 2,855,531 | Nicoll | Oct. 7, 1958 |
| 2,878,394 | Koury | Mar. 17, 1959 |
| 2,919,366 | Mash | Dec. 29, 1959 |